United States Patent [19]

Sardanowsky

[11] 4,174,081

[45] Nov. 13, 1979

[54] APPARATUS FOR SECURING A FLYING CRAFT TO A STARTING AND LANDING AREA

[75] Inventor: Wladimir Sardanowsky, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 861,561

[22] Filed: Dec. 16, 1977

[30] Foreign Application Priority Data

Dec. 23, 1976 [DE] Fed. Rep. of Germany ....... 2658483

[51] Int. Cl.² .............................................. B64F 1/12
[52] U.S. Cl. .................................. 244/17.17; 244/115; 114/297; 248/362
[58] Field of Search ...................... 244/17.17, 115, 116, 244/114 R, 110 R, 100 A; 248/362, 363; 180/115, 116, 119, 126; 294/64 R, 64 B; 185/5, 6; 114/297

[56] References Cited

U.S. PATENT DOCUMENTS

| | | | |
|---|---|---|---|
| 1,567,703 | 12/1925 | Broyles | 244/115 |
| 2,101,399 | 12/1937 | Larsen | 244/17.17 |
| 3,116,897 | 1/1964 | Theed | 244/17.17 |
| 3,307,817 | 3/1967 | Cocito | 248/362 |
| 3,602,543 | 8/1971 | Sjodin | 248/363 |
| 3,752,106 | 8/1973 | Chen | 114/297 |
| 3,892,287 | 7/1975 | Bennett | 180/115 |
| 4,044,862 | 8/1977 | Sayarimuthu | 180/115 |

FOREIGN PATENT DOCUMENTS

| | | | |
|---|---|---|---|
| 2601228 | 7/1977 | Fed. Rep. of Germany | 244/17.17 |
| 90219 | 9/1967 | France | 244/17.17 |
| 916209 | 1/1963 | United Kingdom | 248/362 |

*Primary Examiner*—Galen L. Barefoot
*Attorney, Agent, or Firm*—W. G. Fasse; D. F. Gould

[57] ABSTRACT

The present apparatus for securing a flying craft to a starting and landing area is especially intended for helicopters. In order to secure such a flying craft with a simple, yet effective device, the starting and landing area is provided with a perforated landing platform or plate. A valve below the perforation is connected to an evacuating pump. The flying craft is provided with landing gear capable of sealing the cavity when landing and to start the evacuation pump. In this manner the flying craft is held in position by the vacuum created in the cavity in the manner of a suction cup.

24 Claims, 12 Drawing Figures

APPARATUS FOR SECURING A FLYING CRAFT TO A STARTING AND LANDING AREA

BACKGROUND OF THE INVENTION

The present invention relates to an apparatus for securing a flying craft to a starting and landing area. More specifically, the invention relates to a securing apparatus especially adapted for helicopters.

Devices for recovering and clamping down or securing of helicopters are well known. Thus, the German Patent Publication (DOS) No. 2,505,551 describes an apparatus which comprises a winch driven by an electric motor.

The winch winds up a recovering cable which is lowered by the helicopter during its approach flight. Alternately, the cable may be secured to the helicopter during the landing. In both instances the cable pulls the helicopter down onto the landing surface and secures the helicopter on the landing surface during its parking.

U.S. Pat. No. 3,559,927 illustrates a cable catching device as well as mechanical locking means for securing the landing gear of the helicopter on the landing surface.

The known devices comprise a relatively complicated mechanical structure which makes them expensive. Besides, prior art structures require equipment of substantial weight to be installed in the flying craft itself, whereby the payload, especially of smaller flying craft, may be substantially reduced. To some extent the prior art devices comprise a relatively complicated mechanical system which is trouble prone especially under extreme weather conditions. Such mechanical system requires installation directly under the landing area of the flying craft which means that it has to be installed where very disadvantageous weather conditions prevail, namely, on the deck of an aircraft carrier, on the deck of a lighthouse or a drilling platform or the like.

OBJECTS OF THE INVENTION

In view of the above, it is the aim of the invention to achieve the following objects singly or in combination:

to provide an apparatus of the type described above which is simple in its structure and which may be easily installed with little effort in all places suitable for the landing of a flying craft especially a helicopter;

to construct such a securing apparatus in such a manner that the maximum operational safety is assured;

to minimize the number and weight of the components of the apparatus which must be installed in the flying craft so that the reduction in the payload is substantially avoided or kept within acceptable limits;

to secure a flying craft to a landing area by means of a vacuum which is established only at the time of landing and maintained during the time the craft remains on the landing area, thereby minimizing the energy consumption; and to construct the vacuum system in such a manner that it may be easily adapted to the requirements regarding the size of the landing area, for example, on a large airport with required extensions, or on a minimal landing area such as on an oil drilling tower.

SUMMARY OF THE INVENTION

According to the invention there is provided an apparatus for securing a flying craft to a landing area which is characterized in that the landing area comprises a plate or platform with at least one perforation to form a cavity in the platform. The lower end of the cavity is connected through a valve or the like with a vacuum container or pump. The flying craft is equipped for said securing with suction cups so to speak, which fit over the cavity and which hold the flying craft in position as soon as a sufficient vacuum is established in the cavity.

The advantages of the invention are seen especially in the fact that its structure is very simple that few mechanically movable parts are used and that in this manner the requirement of a high operational safety is shortened in an optimal manner. In addition, the apparatus of the invention requires a relatively small energy expenditure because merely the vacuum pump needs to be driven. The present apparatus operates practically automatically which means that the pilot will not require any assistance for a landing and starting operation. This is so because when the landing gear touches the landing surface the establishment of the vacuum may be triggered by the helicopter itself, especially its landing gear or other fixed points or devices forming part of the landing and securing gear. These actuating sensors trigger the establishment of the vacuum and the securing then takes place automatically.

The entire system may be installed in a landing area except for the suction cups forming part of the landing gear. This has the advantage that additional auxiliary equipment may also be installed in the landing area, such auxiliary equipment comprising, for example, heating devices for preventing the formation of ice in the system. The suction cups may form part of the landing gear of the flying craft and may be constructed so light that they hardly affect the total weight of the craft and hence do not reduce the payload. Another advantage is seen in the fact that the vacuum pumps and/or vacuum containers may be used in different areas by connecting pipes which establish landing areas remote from a given landing area or even remote from the location of the vacuum producing means. Thus, the adaptation of the requirements of any particular situation is especially facilitated by the invention particularly with regard to available space, climatic conditions, or any other reasons.

BRIEF FIGURE DESCRIPTION

In order that the invention may be clearly understood, it will now be described, by way of example, with reference to the accompanying drawings, wherein.

Figure 11:
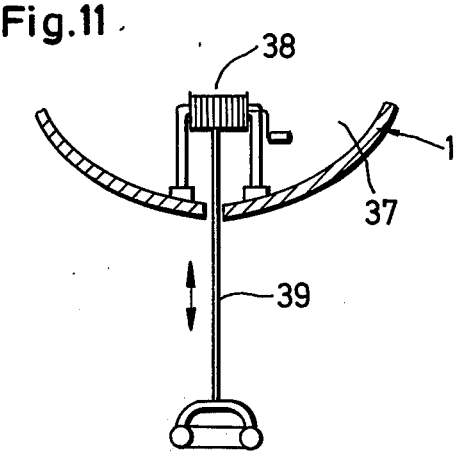
Figure 12:
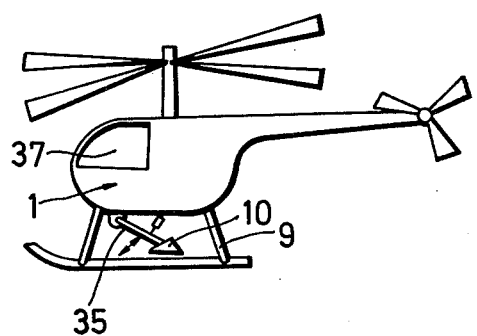

FIG. 11 illustrates another embodiment of the holding mechanism in which the suction cup is secured to the lower free end of a cable, chain, rope, or the like and the suction cup may be raised or lowered by means of a winch; and FIG. 12 illustrates a schematic side view of a flying craft to the fuselage of which there is secured a securing device according to the invention which may be hydraulically, pneumatically, electrically, or mechanically moved up and down, for example, by a tilting action.

DETAILED DESCRIPTION OF PREFERRED EXAMPLE EMBODIMENTS

Figure 1:
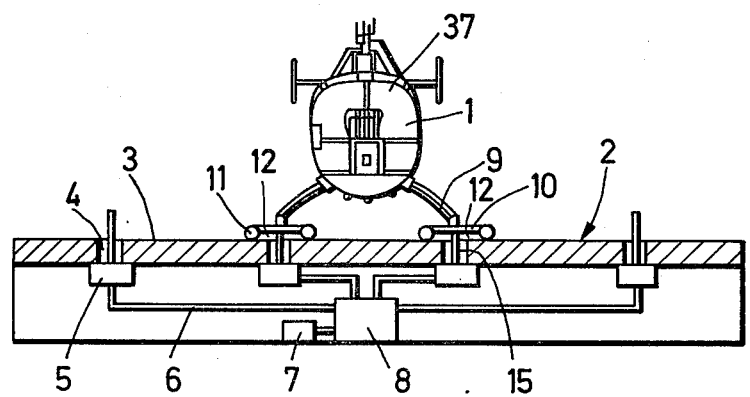
FIG. 1 shows the front view of a helicopter and a section through a landing platform incorporating the securing apparatus of the invention whereby the helicopter is in a position just after touchdown.
Figure 2:
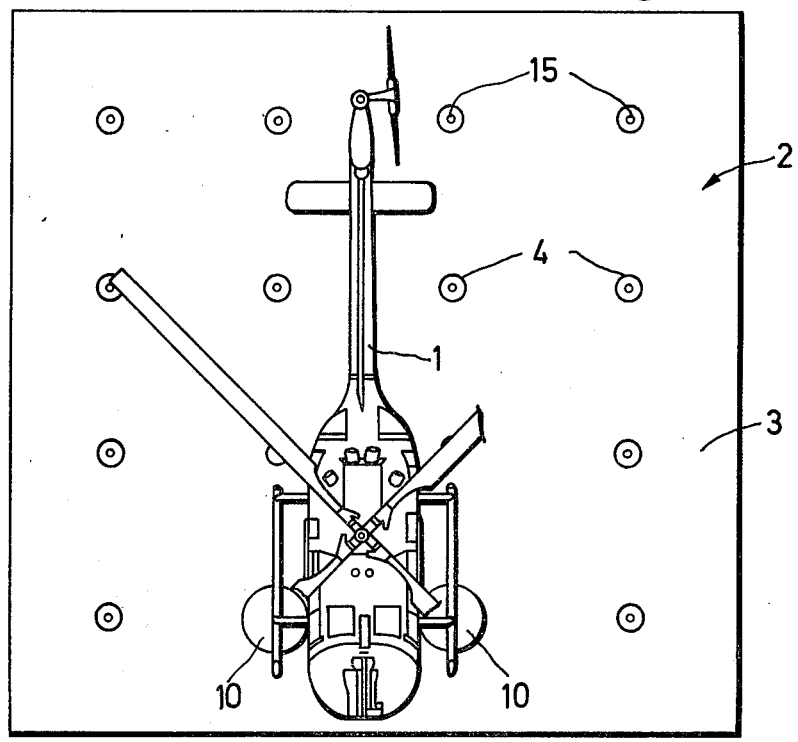
FIG. 2 is a top plan view of a landing platform according to the invention with a helicopter secured in position.

According to FIGS. 1 and 2 the apparatus of the invention comprises a landing surface 2 intended for a flying craft, especially a helicopter 1 or any other type of flying craft. The landing area comprises a plate 3 provided with at least one perforation 4, preferably with a plurality of such perforations. The perforation forms a cavity 4 in the plate 2. Below the cavity a valve 5 is arranged. The valve 5 is connected through a pipe 6 to a source of vacuum 7, preferably through a vacuum container 8 which is evacuated by the pump 7.

The helicopter 1 comprises landing gear 9, the lower end of which is provided with a holding device 10 having the shape of a dish or cup surrounded by a sealing gasket 11 facing downwardly. The gasket 11 is preferably made of a rubber elastic type of material permitting the establishment of a vacuum in the cavity 4. It is also advantageous to make the gasket 11 in the form of a hollow body of elastic material which may be filled with a gas or liquid. The hollow body of an elastic material may also be filled with air. In any event, the hollow body 11 of the holding device 10 is ring shaped to form a proper seal around the cavity 4. In this manner a gas tight or rather, vacuum tight space 12 is formed within the suction cup and cavity 4. The vacuum tight seal between the gasket 11 and the landing surface 2 will tightly hold the flying craft to the landing surface.

By providing the landing surface 2 with a plurality of apertures or cavities 4 as shown in FIG. 2, the pilot has the advantage of selecting any desirable spot on the landing surface 2. The spacing between adjacent apertures 4 may be selected with due regard to the standardized size of flying craft expected to be landing on the landing surface 2 so that in each instance the pilot will find a cavity or aperture 4 close to his securing device 10. Preferably the apertures 4 are equally spaced.

Figure 4:
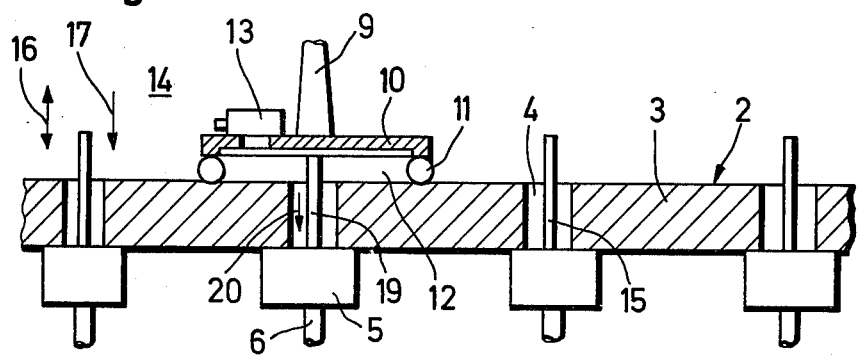
FIG. 4 is a sectional view similar to that of FIG. 3 however after touchdown has been completed with the suction effect holding the helicopter in position.

As shown in FIG. 4 the holding device 10 is provided with a valve 13 to vent the evacuated space 12 to the atmosphere if desired, to release the suction for lift-off.

The valve 5 below the cavity 4 has an actuating member 15. The member 15 is arranged in the cavity 4 of the plate 3 and preferably extends upwardly through the aperture or cavity 4. Preferably the member 15 extends perpendicularly relative to the landing surface 2 for movement up and down as indicated by the directional arrow 16. The actuation of the control member 15 downwardly in the direction 17 from its rest position shown at 18 in FIG. 3 to its work position shown at 19 in FIG. 4 opens the valve 5 so that the cavity 4 is operatively connected through the pipe 6 to the vacuum container 8, whereby a suction flow in the direction indicated by the arrow 20 is established.

FIGS. 5, 6, 7, and 8 show in a somewhat schematic way electrical or electronic devices 21, 22 supported in the landing area or plate 3 and by the flying craft respectively for a wireless actuation of the valve 5 connected to the vacuum container 8.

Figure 5:
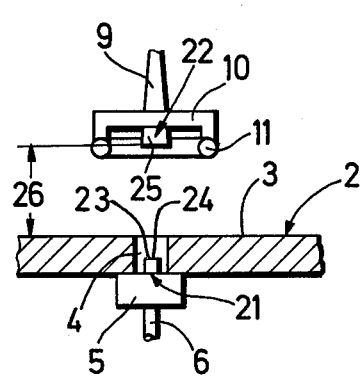
FIG. 5 is a schematic illustration of an electric or electronic device forming part of the flying craft and part of the landing area for the wireless actuation of a valve secured to a vacuum source not shown.

Referring to FIG. 5 the receiver 21 comprises a magnetic coil 23 and a core 24 movable relative to the coil 23. The transmitter 22 secured to the holding device 10 of the flying craft may, for example, comprise an induction element 25 for inducing a current in the coil 23. The transmitter 22 may also be constructed in any other manner suitable for energizing the coil 23 to thereby cause a movement either by the core 24 or by the coil 23 for opening the valve 5. Preferably, the arrangement is such that the wireless interaction of the receiver and transmitter becomes effective when a certain minimum spacing 26 is established.

Figure 6:
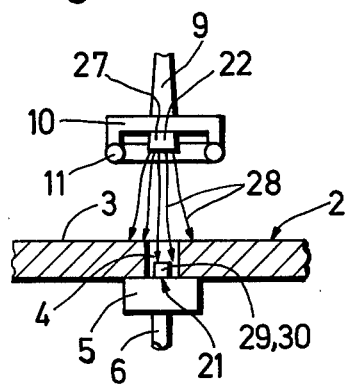
FIG. 6 is a view similar to that of FIG. 5 using a transmitter and receiver for the valve actuation.

FIG. 6 illustrates an embodiment wherein component 21 may comprise a wireless receiver 29 capable of responding to radio signals 28 produced by a transmitter 27. The receiver 29 cooperates with a switch element 30 for operating the valve 5 either directly or by means of suitable auxiliary components of a known type. The transmitter 27 may be installed in the flying craft 1 or it may be attached to the flying craft 1 for actuation by the pilot in the cockpit 37. In an alternative embodiment the transmitter 27 may be located on the landing surface either portable or stationary, but in any event, for use by the ground personnel.

Figure 7:
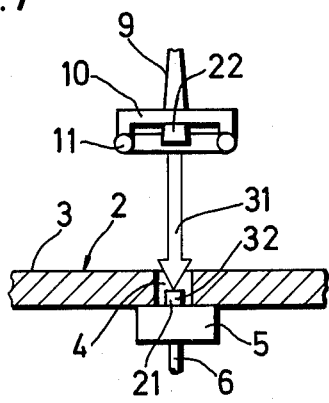
FIG. 7 illustrates an embodiment wherein a laser beam is employed for the valve actuation.

In the embodiment of FIG. 7 the component 21 comprises a laser beam receiver 32 capable of responding to a laser beam 31 for actuating the valve 5 for example, by producing a respective electrical signal as is well known in the art.

Figure 8:
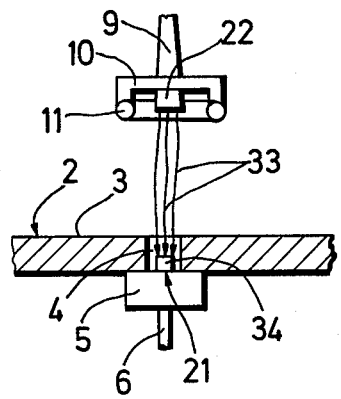
FIG. 8 illustrates an embodiment wherein light or heat is used for the valve actuation.

In FIG. 8 the component 21 comprises a heat or light sensor 34 which responds to a heat or light radiation 33 produced by a respective transmitter in the flying craft.

Figure 3:
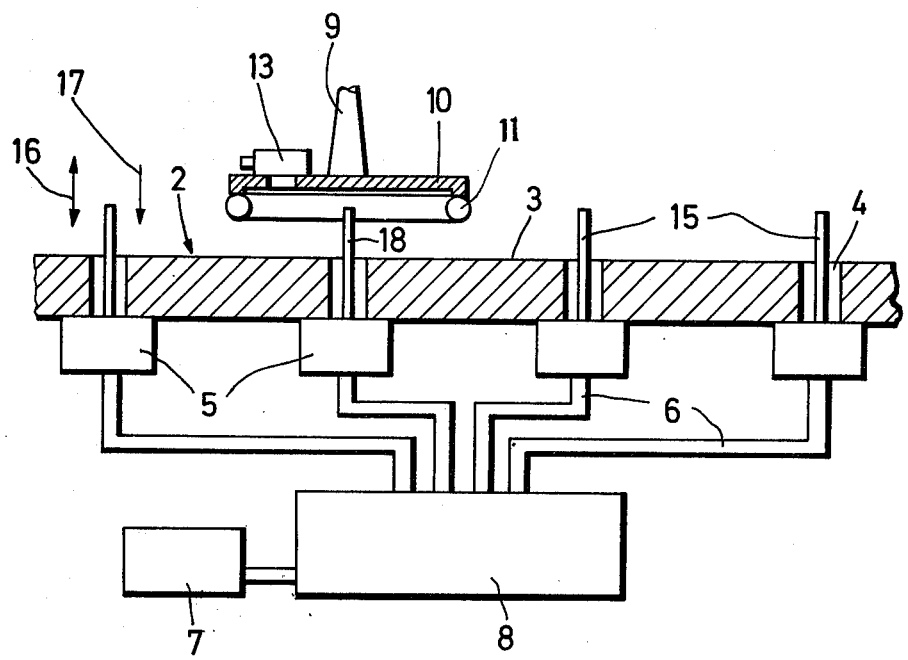
FIG. 3 shows on an enlarged scale, a sectional view similar to the lower part of FIG. 1, wherein one landing gear of a helicopter is shown in a position just prior to touchdown of the helicopter.

The advantage of the embodiments illustrated in FIGS. 5 to 8 for actuating the valve 5 is seen in that these devices as illustrated by reference numbers 21, 22, 23, 24, 25, 27, 28, 29, 30, 31, 32, 33, and 34 are less prone to mechanical damage, hence it is easier to locate these devices in a protected position or manner as compared to the actuating member 15 of the embodiment shown in FIGS. 3 and 4. Another advantage of the embodiments of FIGS. 5 to 8 is seen in that they are not subject to weather conditions and thus operate satisfactorily even under extreme environmental conditions.

Figure 9:
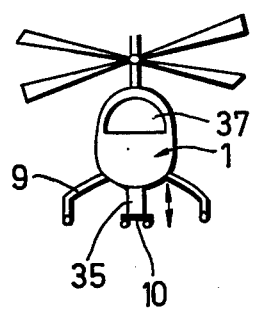
FIG. 9 illustrates a schematic view of a flying craft, wherein the securing apparatus may be moved up and down.
Figure 10:
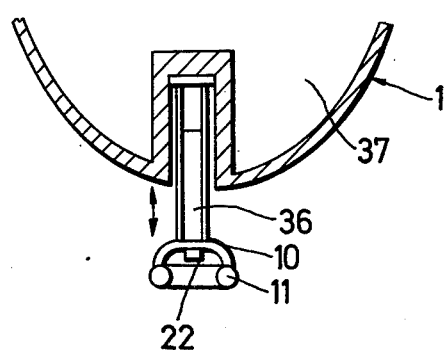
FIG. 10 illustrates a sectional view through a shock absorber which may be extended and pulled in up and down and the lower end of which is provided with a securing suction cup.

FIGS. 9 and 12 show in a schematic illustration a flying craft 1 having a securing device 10 which is supported by a suspension 35 which during the flight may be retracted as shown in FIG. 9 or it may be lifted as shown in FIG. 10. The lifting may be accomplished by a piston cylinder arrangement as shown and the retraction may, for example, be accomplished by constructing the suspensions 35 as a telescoping piston cylinder arrangement. The suspension 35 may be secured to the fuselage of the flying craft 1 either to the underside thereof or laterally thereto. In any event, the arrangement will be such that an interference between the suspension 35 and the landing gear 9 is avoided.

FIG. 10 illustrates a modification in which the suspension for the holding device 10 is a shock absorber 36 which may be retracted in a telescoping fashion during flight and extended for landing. In all embodiments of FIGS. 9, 10, and 12 the drive for extending and retracting the holding device may involve a hydraulic, pneumatic, electric motor or mechanical drive mechanism, any one of which is well known in the art.

FIG. 11 illustrates an embodiment in which the holding device 10 is secured to the lower end of a chain, rope, cable 39, or the like. A winch 38 or the like is provided for winding up to thereby reduce the length of the suspending element 39 or to lengthen it for lowering the holding device 10 down to the landing surface 2. The winch is secured inside the cockpit 37 of the flying craft. Thus, prior to landing an operator can lower the holding device 10 and when the latter has taken hold upon establishment of the vacuum inside the space 12, shortening of the suspension element 39 by operating the winch 38 will pull the flying craft 1 down to the landing surface 2.

The apparatus according to the invention operates as follows. During the landing approach of the helicopter 1 the holding device 10 takes up the position shown, for example, in FIG. 3 which is the rest position, whereby merely care must be taken that the vacuum container 8 and the vacuum pump 7 are capable of producing a sufficiently large vacuum for the intended purpose. The pilot steers the landing flying craft 1 such as a helicopter into such a position above the landing surface 2 that the holding devices 10 hover above the apertures or cavities 4. As the flying craft keeps reducing its elevation, the upper end of the control member 15 is pushed downwardly, whereby the valve 5 is opened to connect the cavity 4 with the vacuum container 8 and to establish a suction flow 20 as shown, for example, in FIG. 4.

When the sealing gasket 11 of the holding device 10 touches the landing surface around the aperture cavity 4, the space 12 is closed in a gas tight manner and any air in the space 12 underneath the holding device 10 is sucked off so that a reduced pressure relative to the atmosphere 14 is established whereby the holding device 10 is securely pressed against the landing surface and held in position on the landing surface.

By opening the valve 13 which possibly could be accomplished from the cockpit 37, an operator may re-establish atmospheric pressure in the space 12 by permitting air to flow into the space 12, whereby the holding action by suction is removed and the flying craft may start. Valve 13 may be operated by a push-pull cable.

Although the invention has been described with reference to specific example embodiments, it will be appreciated, that it is intended to cover all modifications and equivalents within the scope of the appended claims.

What is claimed is:

1. An apparatus for securing a flying craft to a starting and landing area, comprising landing platform means, at least one aperture in said landing platform means, suction means located for cooperation with said aperture, connection means including valve means operatively connecting said aperture in said landing platform means to said suction means, suction cup holding means secured to said flying craft, said suction cup holding means sealing said aperture against the atmosphere, said valve means being operatively arranged relative to said aperture, said valve means comprising actuator means for establishing a vacuum under said suction cup holding means when the latter covers said aperture when said flying craft is landing on said landing platform whereby the suction cup holding means are secured to said landing platform.

2. The apparatus of claim 1, wherein said actuator means of said valve means are operable through said suction cup holding means for actuating the valve means in response to the suction cup holding means covering said aperture.

3. The apparatus of claim 2, wherein said actuator means comprise a rod extending through said aperture above the surface of the landing platform means from said valve means.

4. The apparatus of claim 1, wherein said actuator means comprise receiver means, said apparatus further comprising transmitter means for actuating said valve means in a wireless manner.

5. The apparatus of claim 4, wherein said receiver means comprise induction means including coil means and core means arranged for movement relative to each other, said transmitter means comprising means for inducing an actuation of said valve means, and wherein said transmitter means are carried on said flying craft.

6. The apparatus of claim 5, wherein said inducing means of said transmitter means are effective in response to a given minimum spacing between the transmitter and receiver.

7. The apparatus of claim 4, wherein said receiver means comprise switch means responsive to a radio signal received from said transmitter means.

8. The apparatus of claim 7, wherein said transmitter means comprise a transmitter on the ground.

9. The apparatus of claim 4, wherein said receiver means comprise electronic means responsive to a laser beam, and wherein said transmitter means comprise a laser for transmitting such a beam.

10. The apparatus of claim 4, wherein said receiver means comprise light or heat sensor means, and wherein said transmitter means comprise light or heat radiating means.

11. The apparatus of claim 1, wherein said suction holding means comprise a downwardly open hollow cup body having a polygonal horizontal cross section, said hollow cup body having a downwardly facing edge and a sealing means secured around said edge, said sealing means having a downwardly facing surface in a single plane.

12. The apparatus of claim 11, wherein said sealing means of the suction cup holding means is made of an elastically yielding material.

13. The apparatus of claim 11, wherein said sealing means comprise a ring shaped hollow body of elastic material which may be filled with a liquid or gas.

14. The apparatus of claim 1, wherein said suction cup holding means comprise a hollow body and valve means in said hollow body for venting the space in the hollow body to the atmosphere.

15. The apparatus of claim 14, further comprising actuating means for said valve means, said actuating means connecting said valve means to a location inside said flying craft for actuation by an operator inside the flying craft.

16. The apparatus of claim 1, wherein said suction cup holding means comprise suspension means securing said suction cup holding means to said flying craft, said suspension means comprising means for extending and retracting said suspension means, and thus the suction cup holding means between an operating position and an inoperative position.

17. The apparatus of claim 16, wherein said suspension means comprise telescoping shock absorber means and means for retracting the shock absorber means into the body of the flying craft during flight, and for extending said shock absorber means for landing.

18. The apparatus of claim 16, further comprising means operatively connected to said suspension means for extracting and extending said suspension means.

19. The apparatus of claim 16, wherein said suspension means comprise an elongated flexible member, winch means in said flying craft for winding up said elongated member, said suction cup holding means being secured to the lower free end of said elongated member, whereby the suction cup holding means may be raised and lowered by said winch means.

20. The apparatus of claim 1, wherein said landing platform means comprise a plurality of said apertures, and wherein said connection means comprise pipe means which interconnect said plurality of said apertures through said valve means of the respective aperture to said suction means.

21. The apparatus according to claim 20, wherein said plurality of apertures are arranged at uniform spacings relative to each other in said landing platform means.

22. The apparatus of claim 1, comprising a plurality of said suction cup holding means secured to said flying craft.

23. The apparatus of claim 1, wherein said suction cup holding means are constructed to form the landing gear of the flying craft.

24. The apparatus of claim 1, wherein said connection means comprise pipe means interconnecting said valve means with the suction means, said suction means comprising a vacuum container and a vacuum pump operatively connected to said vacuum container.

* * * * *